(12) United States Patent
Hurwitz

(10) Patent No.: US 9,730,429 B2
(45) Date of Patent: *Aug. 15, 2017

(54) ABRASION RESISTANT OMNIDIRECTIONALLY REFLECTIVE RETRACTABLE PET LEASH

(75) Inventor: Marni Markell Hurwitz, Far Hills, NJ (US)

(73) Assignee: NITE GLOW INDUSTRIES, INC., Far Hills, NJ (US)

( * ) Notice: Subject to any disclaimer, the term of this patent is extended or adjusted under 35 U.S.C. 154(b) by 504 days.

This patent is subject to a terminal disclaimer.

(21) Appl. No.: 12/381,974

(22) Filed: Mar. 18, 2009

(65) Prior Publication Data

US 2009/0241854 A1    Oct. 1, 2009

Related U.S. Application Data

(63) Continuation-in-part of application No. 11/711,995, filed on Feb. 28, 2007, now Pat. No. 7,549,399, which
(Continued)

(51) Int. Cl.
*A01K 27/00* (2006.01)
*D07B 1/14* (2006.01)

(52) U.S. Cl.
CPC .......... *A01K 27/006* (2013.01); *A01K 27/004* (2013.01); *D07B 1/148* (2013.01); *Y10T 29/49826* (2015.01)

(58) Field of Classification Search
CPC ............................ A01K 27/004; A01K 27/006
(Continued)

(56) References Cited

U.S. PATENT DOCUMENTS 2,372,868 A * 4/1945 Warren, Jr. ............... 57/238
3,176,584 A    4/1965 De vries ................. 359/539
(Continued)

FOREIGN PATENT DOCUMENTS

JP    06184967 A * 7/1994 ............ D07B 1/14
JP    10108576 A * 4/1998 ............ A01K 27/00

OTHER PUBLICATIONS

Machine translation for JP06184967.*

*Primary Examiner* — Son T Nguyen
(74) *Attorney, Agent, or Firm* — Ernest D. Buff & Assoc. LLC; Ernest D. Buff; Margaret A. LaCroix

(57) ABSTRACT

A flexible abrasion resistant omnidirectionally reflective retractable pet leash has an omnidirectionally reflective pet leash housed within a retractable housing device. The omnidirectionally reflective pet leash reflects an incoming light beam back in the same direction as it was emanated. The reflected light beam provides accurate illumination of the pet leash and the location of the pet during dusk or nighttime hours. This retractable pet leash is created by surrounding a central braided rope of nylon or polyethylene fibers with a cylindrically braided reflective sleeve. The braided reflective sleeve is composed of braided narrow width reflective strips each comprising a plurality of reflective threads worked together to form a weave. Due to the braided weave of the reflective threads and the arrangement of the microscopic reflectors light incident thereon from virtually any angle is reflected back to its source. Advantageously, the fabric remains supple, facilitating extension and retraction of the leash. The braided construction enables the pet leash to reflect light omnidirectionally over a large angle of acceptance, thereby providing an improved measure of safety for both the pet and the pet handler.

6 Claims, 8 Drawing Sheets

Related U.S. Application Data is a continuation-in-part of application No. 11/185,059, filed on Jul. 20, 2005, now Pat. No. 7,204,206, which is a continuation-in-part of application No. 11/067,442, filed on Feb. 25, 2005, now Pat. No. 6,978,738, which is a continuation-in-part of application No. 10/935,687, filed on Sep. 8, 2004, now Pat. No. 6,925,965.

(60) Provisional application No. 60/591,936, filed on Jul. 28, 2004.

(58) Field of Classification Search
USPC ....... 119/795, 796, 797, 798, 769, 792, 793, 119/794, 859, 858; 87/1, 3, 5, 6, 7, 8, 9, 87/11, 13; 57/204, 207, 210, 225, 231, 57/232, 233, 235, 243, 250, 257, 258, 57/260
See application file for complete search history.

(56) References Cited

U.S. PATENT DOCUMENTS

| | | | | |
|---|---|---|---|---|
| 3,190,178 A | | 6/1965 | McKenzie | 359/514 |
| 3,871,336 A | | 3/1975 | Bergman | 119/106 |
| 3,999,521 A | | 12/1976 | Puiello | 359/518 |
| 4,025,159 A | | 5/1977 | McGrath | 359/514 |
| 4,167,156 A | | 9/1979 | Kupperman | 119/795 |
| 4,173,201 A | | 11/1979 | Chao | 119/859 |
| 4,384,548 A | | 5/1983 | Cohn | 359/518 |
| 4,397,142 A | * | 8/1983 | Bingham | 57/238 |
| 4,407,233 A | | 10/1983 | Bozzacco | 359/518 |
| 4,513,692 A | | 4/1985 | Kuhnsman | 119/797 |
| 4,576,850 A | | 3/1986 | Martens | 428/156 |
| 4,582,885 A | | 4/1986 | Barber | 528/28 |
| 4,668,558 A | | 5/1987 | Barber | 428/156 |
| 4,697,407 A | * | 10/1987 | Wasserman | 57/238 |
| 4,763,985 A | | 8/1988 | Bingham | 359/518 |
| 4,815,818 A | | 3/1989 | Thomas | 359/546 |
| 4,887,552 A | | 12/1989 | Hayden | 119/793 |
| 4,895,110 A | | 1/1990 | LoCascio | 119/859 |
| 4,950,525 A | | 8/1990 | Bailey | 428/164 |
| 4,957,335 A | | 9/1990 | Kuney | 359/541 |
| 5,046,456 A | | 9/1991 | Heyman | 119/859 |
| 5,066,098 A | | 11/1991 | Kult et al. | 359/540 |
| 5,117,304 A | | 5/1992 | Huang et al. | 359/529 |
| 5,140,946 A | | 8/1992 | Pennock | 119/859 |
| 5,200,262 A | | 4/1993 | Li | 442/379 |
| 5,237,448 A | | 8/1993 | Spencer | 119/792 |
| 5,243,457 A | | 9/1993 | Spencer | 119/795 |
| 5,283,101 A | | 2/1994 | Li | 428/141 |
| 5,296,292 A | * | 3/1994 | Butters | 428/375 |
| 5,360,667 A | * | 11/1994 | Boles et al. | 428/364 |
| 5,370,082 A | | 12/1994 | Wade | 119/859 |
| 5,429,075 A | | 7/1995 | Passarella | 119/795 |
| 5,523,927 A | | 6/1996 | Gokey | 362/103 |
| 5,535,106 A | | 7/1996 | Tangen | 362/108 |
| 5,558,044 A | | 9/1996 | Nasser, Jr. | 119/796 |
| 5,630,382 A | | 5/1997 | Barbera | 199/859 |
| 5,762,029 A | | 6/1998 | DuBois | 119/796 |
| 5,777,790 A | | 7/1998 | Nakajima | 359/536 |
| 5,850,807 A | | 12/1998 | Keeler | 119/799 |
| 5,882,796 A | | 3/1999 | Wilson et al. | 428/411.1 |
| 5,910,858 A | | 6/1999 | Frey | 359/534 |
| 5,926,314 A | | 7/1999 | Smith et al. | 359/530 |
| 5,962,108 A | | 10/1999 | Nestegard et al. | 428/172 |
| 5,967,095 A | | 10/1999 | Greves | 119/795 |
| 6,070,556 A | | 6/2000 | Edwards | 119/792 |
| 6,159,537 A | * | 12/2000 | Crandall | 427/163.4 |
| 6,170,968 B1 | | 1/2001 | Caswell | 362/469 |
| 6,289,849 B1 | | 9/2001 | Macedo | 119/796 |
| 6,557,498 B1 | | 5/2003 | Smierciak | 119/858 |
| 6,677,028 B1 | * | 1/2004 | Lasch et al. | 428/161 |
| 2003/0154931 A1 | * | 8/2003 | Ostrowiecki | 119/796 |
| 2006/0162674 A1 | * | 7/2006 | Neiser | 119/795 |

\* cited by examiner

ABRASION RESISTANT OMNIDIRECTIONALLY REFLECTIVE RETRACTABLE PET LEASH

CROSS-REFERENCE TO RELATED APPLICATIONS

This application is a continuation-in-part of U.S. application Ser. No. 11/711,995, filed Feb. 28, 2007 now U.S. Pat. No. 7,549,399, which, in turn is a continuation-in-part of U.S. application Ser. No. 11/185,059, filed Jul. 20, 2005 now U.S. Pat. No. 7,204,206, which, in turn is a continuation-in-part of U.S. application Ser. No. 11/067,442, filed Feb. 25, 2005, now U.S. Pat. No. 6,978,738, which, in turn is a continuation-in-part of U.S. application Ser. No. 10/935,687, filed Sep. 8, 2004, now U.S. Pat. No. 6,925,965, which, in turn, claims the benefit of application Ser. No. 60/591,936, filed Jul. 28, 2004.

BACKGROUND OF THE INVENTION

1. Field of the Invention

The present invention relates to pet leashes; and more particularly, to an abrasion resistant omnidirectionally reflective retractable pet leash especially suited for use during dusk or nighttime hours to enhance safety of pets and their owners while walking in the vicinity of land vehicles.

2. Description of the Prior Art

Walking a pet during dusk or nighttime hours can be hazardous in neighborhoods where automobiles are encountered. Illuminating characteristics of the automobile headlamps, generally afford an illumination range of approximately 25 to 50 feet. This illumination range can be significantly reduced by mist or fog, or bends in the road. Despite improvements to vehicle headlights, pets and their owners are oftentimes not recognized by automobile drivers until the distance between the automobile and the pet is small.

Several approaches devised by prior art workers attempt to provide solutions for this hazardous common activity. These approaches include 1) use of pet collars that are illuminated or reflective; 2) use of leashes which are illuminated or reflective; or 3) a combination of both features. None of these solutions suggest indicating the whereabouts of a pet owner, a leash and a pet attached to the leash via omnidirectional reflection.

Various types of illuminated dog collars using bulb or other powered sources are known in the art. These power-illuminated leashes require batteries, light bulbs or other lighting elements, which are not needed for reflective illumination. Accordingly, a detailed discussion thereof is not required.

U.S. Pat. No. 4,173,201 to Chao, et al. discloses an illuminated collar for pets and the like. U.S. Pat. No. 4,513,692 to Kuhnsman, et al. discloses an illuminated pet leash comprising a non-opaque tube that contains one or more bundles of optical fibers. U.S. Pat. No. 4,895,110 to Lo Cascio discloses a pet collar that includes a light source and a power source attached to a strap. U.S. Pat. No. 4,887,552 to Hayden discloses an electrically lighted pet leash that is composed of a transparent, flexible tube containing a string of small electric light bulbs mounted in parallel between two insulated wires. U.S. Pat. No. 5,046,456 to Heyman, et al. discloses an illuminated pet collar in which multiple lights are mounted within a flexible, light-permeable tube that extends about the perimeter of the collar. A housing mounted on one end of the tube contains a circuit and a battery for operating the lights. U.S. Pat. No. 5,140,946 to Pennock, et al. discloses an illuminated pet collar with miniature lights powered by a battery encased within a flexible, pliable, transparent plastic display tube, which are parallel-wired within the display tube. U.S. Pat. No. 5,370,082, to Wade discloses an animal collar that includes illuminating devices, such as light emitting diodes, liquid quartz strips or electric lamps powered by a plurality of solar cells. U.S. Pat. No. 5,429,075 to Passarella, et al. discloses a pet leash and flashlight combination. U.S. Pat. No. 5,523,927 to Gokey discloses an illuminated animal collar light emitting diode placed on the outer exterior of a collar powered by a battery. U.S. Pat. No. 5,535,106, issued to Tangen, discloses a lighted animal collar that includes a plurality of separate light emitting assemblies, or housings, at spaced intervals along the collar. U.S. Pat. No. 5,558,044 to Nasser, Jr. et al. discloses an illuminating leash handle with a flashlight. U.S. Pat. No. 5,630,382 to Barbera, et al. discloses an illuminated pet harness having straps with internal cavities that contain fiber optic cores illuminated by a light bulb. U.S. Pat. No. 5,762,029 to DuBois, et al. discloses a combined retractable leash and flashlight. U.S. Pat. No. 5,850,807 to Keeler discloses an illuminated pet leash, wherein illumination is remotely activated by a pet owner to locate the leash. U.S. Pat. No. 5,967,095 to Greves discloses an electroluminescence-illuminated pet flat leash strap. U.S. Pat. No. 6,170,968 to Caswell discloses a motion activated rotatable illuminator. U.S. Pat. No. 6,289,849 to Macedo, et al. discloses a device for removably attaching a flashlight to a retractable dog leash. U.S. Pat. No. 6,557,498 to Smierciak, et al. discloses a night safety pet illumination marker, with a pet collar having a series of light emitting diodes mounted around the perimeter of the collar and powered by battery power.

Various types of dog collars illuminated by reflection are known in the art. Representative dog collars of this variety are discussed below.

U.S. Pat. No. 3,871,336 to Bergman discloses a reflective dog collar which is not illuminated; but which utilizes a highly reflective material having the form of different color dots encapsulated in plastic. This illuminates only portions of the flat planar pet collar.

U.S. Pat. No. 3,999,521 to Puiello discloses a reflective safety harness for quadruped animals. The harness includes a pair of identical sheet elements with a light reflective surface mounted on opposite sides of the animal. At the corners of the sheet are fastened straps, which circumscribe the animal's body at the front and rear of the harness. Extending from the front strap, at the top point thereof, midway between the two elements, is a loop through which the dog's regular collar is passed. The arrangement assures immovable attachment of the harness on the dog's body. The disclosure by the '521 patent of a reflective sheet positioned on both sides of the animal does not suggest a pet collar or a leash that reflects incident light.

U.S. Pat. No. 4,167,156 to Kupperman, et al. discloses a reflective animal leather leash. The elongated leather animal leash includes a sewn a transparent polyvinyl chloride strip with a light reflective prism design on one surface. The light reflective prism is bonded by dielectric heat sealing or sonic welding to an opaque polyvinyl chloride strip sewn to the leather strip, resulting in a leash having a light reflective surface. Since the strip has a reflective surface on only one side of the leash, it does not reflect light in every direction. The flat leather leash is not easily twistable and is not readily bent without separating the transparent and opaque polyvinyl chloride layers.

U.S. Pat. No. 4,384,548 to Cohn discloses a safety device for animals. A pet collar uses retro-reflective threads with glass reflective elements in a flexible webbing to form a pet leash. The top and bottom sides of the leash each include retro-reflective means in the form of a plurality of threads interwoven with the webbing in substantially parallel paths. Each thread is formed having a plurality of glass reflective elements or beads extending along the length thereof for reflecting incident light directly back toward the source. Disposition of reflective threads in the webbing forming the collar is sparse and the threads are arranged in parallel relation, not braided. As a result, the quantum of incident light reflected is small; and an insignificant quantum of incident light is reflected back to the source.

U.S. Pat. No. 4,407,233 to Bozzaco discloses a safety collar for pets. The collar has highly reflective flexible elements with a length large enough to extend beyond the outer surface of the pet's hair. It uses flexible elements with Scotchlite reflecting strips attached to a collar. A retractable reflective pet leash is not disclosed, and the flexible elements do not reflect light in every direction.

U.S. Pat. No. 5,243,457 to Spencer discloses a material with enhanced visibility characteristics. This flexible visibility enhancing material combines the advantages of a light reflective component and a luminescent component. The material includes a first layer of prismatic light reflective plastic material having an underlying surface formed with a plurality of minute prism-like formations projecting there from at regular spaced intervals, and an overlying substantially smooth light transmissive surface. Bonded, i.e. by heat-sealing, to the first layer is a second layer of plastic luminescent material. The second layer is contiguously and integrally attached to the underlying surface of the prism-like formations and generally coextensive therewith. The visibility enhancing material simultaneously radiates luminescent light from the second layer through the underlying surface of prism-like formations and through the smooth light transmissive surface and reflects light from the prism-like formations through the smooth light transmissive surface. In one embodiment, a leash for controlling and restraining a pet animal includes a flexible elongate member comprised of the visibility enhanced material. In another embodiment, the second layer is replaced with a layer of luminescent material, which can be selectively energized to become luminous. Since the transparent reflective material is a molded plastic of prismatic construction it is rigid and is not flexible and does not form a leash that is capable of being twisted and bent. Further any twisting and bending action separates the reflective element from the luminescent element.

U.S. Pat. No. 5,237,448 to Spencer, et al. discloses a visibility enhancing material. The flexible visibility enhancing material combines the advantages of a light reflective component and a luminescent component. The material includes a first layer of prismatic light reflective plastic material having an underlying surface formed with a plurality of minute prism-like formations projecting therefrom at regular spaced intervals, and an overlying substantially smooth light transmissive surface. A second layer of plastic luminescent material is contiguously and integrally attached to the underlying surface of the prism-like formations and generally coextensive therewith. The visibility enhancing material simultaneously radiates luminescent light from the second layer through the underlying surface of the prism-like formations and through the smooth light transmissive surface, and reflects light from the prism-like formations through the smooth light transmissive surface. In one embodiment, a leash for controlling and restraining a pet animal includes a flexible elongate member comprised of the visibility enhanced material. Since the transparent reflective material is a molded plastic of prismatic construction, it is rigid and is not flexible and does not form a leash that is capable of being retracted, twisted and bent. Furthermore, any twisting and bending action will result in separation of the reflective element from the luminescent element.

U.S. Pat. No. 6,070,556 to Edwards discloses an illuminating dog safety system. This illuminating dog safety system is designed for allowing an animal to be more visible at night. The device includes a collar that is worn around a neck of an animal. The collar has a reflective strip extending a majority of its length. A harness is provided that is adapted to be worn around a torso of the animal. The harness is comprised of an upper strap member, a lower strap member, and a longitudinal extension there between. The upper strap member, the lower strap member, and the longitudinal extension each have a reflective strip extending a majority of a length thereof. A leash is provided that is adapted for securement to the collar. The leash has a reflective strip extending a majority of its length. All these strip elements are made from flat elements, as shown in FIG. 3 of the patent disclosure. Twisting the elements does not provide the reflectivity needed for adequate visibility at night.

Numerous patents disclose reflective materials. Some of these patents disclose reflective elements having corner cube shapes embedded in a rigid or flexible polymeric strips and monolayers of spherical beads, i.e. primarily glass beads bonded to a reflective sheet.

U.S. Pat. No. 3,176,584 to DeVries, et al. discloses that a reinforcing layer may be incorporated into an embedded lens retroreflective sheeting. The reinforcing layer may be of a similar composition as the binder in which the microspheres are embedded. The layer may be applied to the back side of the secularly reflective layer via spraying, i.e., by a solvent-coating technique. Examples of the reinforcing layer materials disclosed include methyl methacrylate, flexible epoxy resins, chloro-sulfonated polyethylene, polystyrene, polypropylene, polycarbonate resin, ethyl cellulose, and cellulose acetate-butyrate. The reflective layer is typically very thin and fragile, i.e. in the order of 0.06 microns thick, and must be disposed in special relationship to the microspheres in order for the sheeting to provide useful retro-reflection.

U.S. Pat. No. 3,190,178 to McKenzie discloses a reflex reflective sheeting. It uses a monolayer of microspheres embedded in a polymer to reflect the incoming light beam in the same direction as the incident beam. Since the sheet is formed by melting of the polymeric binder, it is rigid and therefore unsuitable for flexible pet leashes.

U.S. Pat. No. 4,025,159 to McGrath discloses cellular retroreflective sheeting. The cellular retroreflective sheeting comprises a base layer of retroreflective elements and a transparent cover film supported in spaced relation away from the base layer by a network of narrow intersecting bonds. These bonds form hermetically sealed cells within which retroreflective elements are isolated from retroreflective elements of different cells. The resultant sheeting achieves greater durability through use of bonds that are cured in situ after they have been thermoformed into sealing contact between the cover film and base layer. The base material is coated with the binder, subjected to heat and pressure to displace the binder around the embedded microsphers or corner cubes forming the bonded network. Retroreflective articles so constructed may be rigid and inflexible.

U.S. Pat. No. 4,576,850 to Martens, and U.S. Pat. Nos. 4,582,885, 4,668,558 to Barber disclose a shaped plastic articles having replicated microstructure surfaces. This shaped plastic article is made by crosslinked polymer with hard and soft segments having a microstructure-bearing surface that is replicated, with a castable fluid, and radiation hardened. Articles formed by this process exhibit, a retroreflective cube-corner sheeting, Fresnel lens or video disc. All these formed articles are rigid and therefore unsuitable for use in retractable pet leashes. Moreover, these articles also exhibit low tear strength.

U.S. Pat. No. 4,763,985 to Bingham discloses a launderable retroreflective appliqué that comprises a layer of transparent microspheres, a specular reflective layer optically connected to each microsphere, and a binder layer into which the microspheres are partially embedded. Resins disclosed as being suitable for use as binder layers include polyurethane, polyesters, polyvinyl acetate, polyvinyl chloride, acrylics, or combinations thereof. The specular reflective layers are composed of two succeeding layers of dielectric material. The layers have varying refractive indices and are composed of a variety of binary metal compounds including oxides, sulfides, and fluorides.

U.S. Pat. No. 4,815,818 to Thomas discloses three-dimensional flexible reflectors. The reflector is provided with elastomeric resilient member with a plurality of embedded retro-reflective glass beads. A portion of the outer surface of the elastomeric material is removed to expose the glass beads. The exterior surface of the glass beads at the outer surface is exposed and is subject to abrasion.

U.S. Pat. No. 4,950,525 to Bailey discloses elastomeric retroreflective sheeting. The elastomeric retroreflective sheeting has a monolayer of non-stretchable microspheres. These microspheres are embedded in a sheet with a spacing layer of transparent elestomeric material underlying the back surface of the microspheres. A cover layer of transparent elastomeric material covers the front surface of the microspheres. A specularly reflective layer is disposed on the back surface of the spacing layer. The cover layer comprises clear thermoplastic elastomeric aliphatic polyurethane.

U.S. Pat. No. 4,957,335 to Kuney discloses microsphere-based retro-reflective articles having high retroreflective brightness at narrow divergence or observation angles, i.e. up to 0.5 degrees. The article is made by selection of microspheres having defined combinations of average diameter and average refractive index. This patent teaches (column 4, lines 18-23) that variation in the size of the microspheres will increase the observation angle or divergence angle of the resultant retro-reflective article.

U.S. Pat. No. 5,066,098 to Kult, et al. discloses cellular encapsulated-lens high whiteness retroreflective sheeting with a flexible cover sheet. This cellular, encapsulated-lens retroreflective sheeting comprises a base sheet of a monolayer of retroreflective elements that is partially embedded in a binder layer which typically is white. A cover sheet is disposed in spaced relation from the layer of retroreflective elements. A network of narrow intersecting bonds, or seal legs, that extend between the cover sheet and the base sheet with binder material are thermoformed at the point of contact between the base sheet and cover sheet. Such a rigid, reflective sheet is unsuitable for retractable pet leashes, which require structures that can twist and flex.

U.S. Pat. No. 5,117,304 to Huang, et al. discloses a retroreflective article. The retroreflective article has corner cubes and is flexible, and can be applied over irregular surfaces by using an optically clear, aliphatic polyurethane polymer. The aliphatic polymer has a plurality of hard chain segments having the formula —C(O)N(H)—$C_6H_{10}$—N(H)C(O)—.

U.S. Pat. No. 5,200,262 to Li discloses a launderable retroreflective appliqué. The appliqué employs a reflector that comprises elemental aluminum or elemental silver on the backside of the microspheres. The appliqué comprises a monolayer of metal-coated microspheres partially embedded in and partially protruding from a binder layer. The binder layer comprises a flexible polymer having hydrogen functionalities and one or more isocyanate-functional silane coupling agents. The disclosed flexible polymers that possess hydrogen functionalities are crosslinked, flexible urethane-based polymers, such as isocyanate-cured polymers or one or two component polyurethanes and polyols.

U.S. Pat. No. 5,283,101 to Li discloses a launderable retroreflective appliqué comprising a binder layer formed from an electron-beam curable polymer and typically one or more crosslinkers and silane coupling agents. Electron-beam curable polymers include chlorosulfonated polyethylenes, ethylene copolymers comprising at least about 70 weight percent of polyethylene, such as ethylene/vinyl acetate, ethylene/acrylate, and ethylene/acrylic acid, and poly(ethylene-co-propylene-co-diene) polymers. Glass microspheres are embedded in the cured binder layer, and a specular reflective metal layer is disposed on the embedded portions thereof. When the appliqué is inverted, light comes through the binder layer.

U.S. Pat. No. 5,777,790 to Nakajima discloses a microsphere-based retroreflective article. The retroreflective article comprises a monolayer of microspheres partially embedded in and protruding from a binder layer and specular reflector underlying the microspheres. The monolayer of microspheres comprises a mixture of a first class of microspheres having a first refractive index and a second class of microspheres having a second refractive index. The second refractive index is higher than the first refractive index. As a result, the sheeting exhibits superior observation angle angularity.

U.S. Pat. No. 5,882,796 to Wilson, et al. discloses bonded structured retroreflective sheeting. The structured retroreflective sheeting includes an array of corner cube structured retroreflective elements, a thermoplastic sealing film located proximate the structured elements, and bonding agent between the sealing film and the structured retroreflective elements. The bonding agent bonds the sealing film to the structured retroreflective film. This bonded structure is rigid and is unlikely to survive the flexing and twisting movements of a retractable pet leash.

U.S. Pat. No. 5,926,314 to Smith, et al. discloses a retroreflective cube corner article having scalene base triangles. The cube corner retroreflective article exhibits a wide range of retroreflective entrance angularity in at least one plane, and preferably in two or more planes. The structured surface has an array of cube corner elements formed by three intersecting sets of substantially parallel grooves. Each cube corner element includes a base triangle bonded by one groove from each of the three intersecting groove sets, the base triangle being scalene. The corner cube reflector is rigid and cannot be used for producing reflective leashes.

U.S. Pat. No. 5,962,108 to Nestegard, et al. discloses a retroreflective polymer coated flexible fabric material and method of manufacture. The retroreflective polymeric coated flexible fabric material has a retroreflective layer and a polymeric compatibilizing layer welded to a polymeric coated outer surface of a flexible fabric material. The compatibilizing layer provides an intermediate layer between the retroreflective layer and the flexible fabric material, creating suitable bond strength between dissimilar polymers. Flexible fabric materials are polyester, nylon or cotton. The fabric is coated with highly plasticized polyvinyl chloride (PVC) or ethylene acrylic acid copolymer (EAA). These polymers are flexible, durable, and resistant to abrasion. The retroreflective prismatic elements layer includes: acrylic polymers, such as poly(methylmethacrylate); polycarbonates; cellulosics; polyesters such as poly(butyleneterephthalate); poly(ethyleneterephthalate); fluoropolymers; polyamides; polyetherketones; poly(etherimide); polyolefins; poly(styrene); poly(styrene) co-polymers; polysulfone; urethanes, including aliphatic and aromatic polyurethanes; and mixtures of the above polymers such as a poly(ester) and poly(carbonate) blend, and a fluoropolymer and acrylic polymer blend. The compatibilizing layer that is suitable for bonding between a retroreflective layer and a flexible fabric material include: polyurethane, ethylene methyl acrylate copolymer, ethylene N-butyl acrylate copolymer, ethylene ethyl acrylate copolymer, ethylene vinyl acetate copolymer, polymerically plasticized PVC, and polyurethane primed ethylene acrylic acid copolymer. Such a reflective fabric does not suggest the shape, construction or function of a retractable pet leash.

U.S. Pat. No. 5,910,858 to Frey discloses retroreflective sheeting with a coated back surface. The retroreflective sheet has a plurality of indentations on the back surface to reflect the light, and a transparent front surface to encapsulate and protect the light reflecting indentations. This reflective sheet is rigid and is unsuitable for use in retractable pet leashes, or pet leashed in general.

U.S. Pat. No. 6,159,537 to Crandall discloses a method of making a retroreflective article that has a binder layer containing an epoxy resin and silicone crosslinked polymer. A pre-binder composition comprises about 5 to about 40 parts of an epoxy resin. About 60 to about 95 parts of an alkoxysilane terminated polymer is applied to a retroreflective layer and then cured to form a binder layer that is adhered to the retroreflective layer and an article of clothing. The binder composition does not cover the exterior surface of the reflective layer and does not provide abrasion resistance.

U.S. Pat. No. 6,677,028 to Lasch, et al. discloses retroreflective articles having multilayer films and methods of manufacturing same. These retroreflective articles have multilayer films and are useful for commercial graphics and retroreflective products, such as roll-up signs for highway transportation safety. The articles comprise multilayer films having at least one layer of polyurethane and a core layer of a copolymer of alkylene and a bond layer of non-acidic, polar co-monomer including, ethylene copolymer, vinyl acetate, acrylate, EVA, acid-modified EVA, anhydride-modified EVA, acid-acrylate-modified EVA, anhydride-acrylate-modified EVA, EEA, EMA, AEA, EVACO, EBACO, and EnBA. The glass retroreflective beads comprise an air-exposed portion or have an overlay polyurethane or EAA cover film. When retroreflective glass beads are exposed to air, they are subject to wear.

Notwithstanding the efforts of prior art workers to construct pet leashes, retractable pet leashes, and pet collars that are illuminated by incident light, there remains a need in the art for a flexible, preferably abrasion resistant, retractable pet leash that omnidirectionally reflects a significant quantum of incoming light back to its source. Numerous methods for producing retroreflectors have been disclosed. A lightweight flexible retractable pet leash having a robust construction that withstands tensile and torsional forces attending leash usage, has long been needed in the art. Also needed is a flexible, omnidirectionally reflective pet leash capable of maintaining high reflectivity when subjected to surface abrasion from frictional forces created by contact of the leash with objects having rough exteriors, such as the ground, flooring, posts, trees and the like.

SUMMARY OF THE INVENTION

The present invention provides a retractable pet leash that is abrasion resistant and omnidirectionally reflective. Omnidirectional reflectivity is provided by the incorporation of retroreflective corner cube reflectors or microsphere reflective elements thermally bonded onto threads. Preferably, each thread is formed having a plurality of glass reflective elements or beads extending along the length thereof so that the retro-reflective threads reflect a large portion of light emitted from a light source back to the light source such that the pathway for the angle of reflection of the light is substantially the same as the pathway for the angle of incidence. With this structure, the leash reflects a significant quantum of the incident light from a car head light or other light emitting element back to the source.

Preferably, abrasion resistance properties are provided by applying a transparent coating onto the retractable pet leash. One such coating comprises a polymer that is transparent, flexible and has a refractive index significantly smaller than that of the retroreflective elements used. Abrasion resistance and omnidirectional reflectivity is achieved by: a) creating a weave of retroreflective threads comprising a plurality of corner cube reflectors or microspheres spheres bonded via a transparent bond thereto to produce narrow width reflective strips preferably having a strip width in the range of 0.0065 inch to 0.25 inch, depending upon the size of the central cylindrical rope core; b) cylindrically braiding, at a shallow braid angle, three or more narrow width reflective strips to surround and cover the external surface of a central cylindrical leash core made from braided nylon or polypropylene fibers; c) forming a cylindrical retroreflective braided sleeve integrally surrounding a central cylindrical leash core to thereby create a leash having an external retroreflector surface; and d) preferably, coating the external surface of the cylindrical retroreflective braided sleeve with a transparent, flexible abrasion resistant coating having a refractive index significantly less than that of the retroreflective elements. The thickness of the transparent abrasion resistant coating is in the range of 0.002 to 0.010 inches.

The retractable pet leash has a central section, a proximal end and a distal end. The transparent abrasion resistant coating may be applied to the entire length of the pet leash between the proximal and distal ends (i.e. the central section). Alternatively, the abrasion resistant coating may be applied to the reflective threads directly before weaving to form the narrow width reflective strips. Or, the abrasion resistant coating may be applied to each of the narrow width reflective strips prior to braiding.

The proximal end of the retractable pet leash is fixedly connected to a reel that is located in an internal chamber of a retractable housing device. The retractable housing device is constructed with a handle portion, a retraction control member actuated by a retraction control switch, a housing body appointed with the internal chamber having the reel member therein mounted, and an extension-retraction aperture. The distal end of the leash appends from the extension-retraction apertures of the retractable housing device. In an alternative embodiment, the distal end includes an extension leash which appends from the extension-retraction aperture of the retractable housing device. The distal end (or the extension leash if one is used) is appointed to accommodate a hardware component operable with a pet collar.

The proximal end of the pet leash is retained by the reel member so that the proximal end is wrapped around and engages with the reel member. The central section of the retractable leash is releaseably spirally arranged within the internal chamber when the retractable leash is in a retracted position. Conversely, the central section of the retractable leash extends from the internal chamber and traverses the extension-retraction aperture when the retractable leash is in an extended position.

The distal end of the leash is appointed to accommodate a hardware component operable with a pet collar. Preferably, the distal end of the leash is attached to an extension leash, which is appointed to accommodate a hardware component operable with a pet collar. Preferably, the extension leash includes reflective properties therein. Most preferably, the extension leash is an omnidirectionally reflective extension leash constructed with a cylindrical reflective braided extension sleeve comprising three or more narrow width reflective strips comprised of a plurality of reflective threads, with the strips being braided at a shallow cylindrical braid angle and being operable to surround a central cylindrical braided extension rope core thereby providing omnidirectional reflectivity to the extension leash. Preferably, the cylindrical reflective braided extension sleeve of the omnidirectionally reflective extension leash is substantially coated with a conformal transparent polymeric abrasion resistant coating.

Alternatively, the distal end is forms a choke collar. Or, where an extension leash is applied, it may be formed with a mechanical hardware, such as a metallic ring, and constructed to form a choke collar that encircles the neck of the pet creating a retroreflective collar. In another second embodiment, the extension leash has an adjustable metallic strip with one or more holes that lock with a pet leash clamp forming a reflective pet collar that is non-choking.

The cylindrical character of the flexible cylindrical braided sleeve reflects a significant quantum of incident light back to the source effectively since some portion of the braided sleeve is always at angles close to normality and most of the braided cylindrical sleeve falls within the reflecting angular range of the retroreflectors. The shallow braiding angle of the cylindrical braid sleeve lays the thermally bonded narrow width strips composed of the reflective threads at a shallow angle with respect to the length of the cylindrical central core. As a result the leash can be readily flexed or twisted due to the relative movement provided within the cylindrical braid sleeve structure. The flexibility of the transparent abrasion resistant coating provides for flexing and twisting movement of the abrasion resistant pet leash without coating separation or delamination.

Preferably, the external surface of the cylindrical retroreflective braided sleeve is coated with a transparent, flexible abrasion resistant polymeric coating. The coating has a refractive index significantly lesser than that of retroreflective elements bonded to the reflective threads. Typically the retroreflective elements have a refractive index of 1.9 to 2.2 and the flexible transparent abrasion resistant polymeric coating has a refractive index of 1.3 to 1.55. A 0.002 to 0.010 inch layer of transparent flexible abrasion resistant polymeric coating does not affect the path of normally incident incoming light beam. With such a coating alteration of the path of inclined incident light beam is minimal. Similarly, the reflected light beam path is not severely affected. The internal reflection property of the retroreflective elements is not deteriorated since the abrasion resistant coating has significantly lower refractive index, as compared to that of the retroreflective elements.

In another embodiment the reflective retractable pet leash comprises a central cylindrical braided rope core and a cylindrical reflective braided sleeve comprising three or more narrow width reflective strips formed from reflective threads worked into a weave that are braided along with colored threads at a shallow cylindrical braid angle that is operable to surround the central cylindrical braided rope core thereby providing omnidirectional reflectivity. The narrow width reflective strips comprise woven or knitted reflective threads. Each thread is formed having a plurality of glass reflective elements or beads extending along the length thereof bonded thereto with a transparent bond layer. In an alternative construction, there is used an advanced reflective and coating technology wherein microscopic reflectors are embedded into the threads. These microscopic reflectors operate collectively to provide a reflective medium that acts like smooth mirrors, enabling reflection of light back to its source. With this construction, the threads remain supple, facilitating extension and retraction of the leash. Examples of reflective thread can be commercially found via: Jinjiang YeShiMing Reflective Material Co., Ltd, under the brand name YSM; another type of reflective thread is sold by 3M under the trade name 3M™ Radiant Light Films—which provides films that can be slit to make 0.01" (0.25 mm) fibers.

The reflective retractable pet leash further comprises a retractable housing device having a handle portion, a retraction control member actuated by a retraction control switch, a housing body with an internal chamber appointed with a reel member, and an extension-retraction aperture. An extension leash is preferably provided, which is attached to the distal end and is appointed to append from the extension-retraction aperture of the retractable housing device and is appointed to accommodate a hardware component operable with a pet collar. Finally, the retractable leash has a central section, a proximal end and a distal end. The proximal end is retained by the reel member so that the proximal end is wrapped around and engages with the reel member, while the distal end is attached to the extension leash. The central section of the retractable leash is releaseably spirally arranged within the internal chamber when the retractable leash is in a retracted position. The central section of the retractable leash extends from the internal chamber and traverses the extension-retraction aperture when the retractable leash is in an extended position.

A process for manufacture of a reflective retractable pet leash is provided comprising the first set of steps for forming the omnidirectionally reflective pet leash structure, including: (a) selecting a braided nylon or polypropylene cylindrical central rope, said cylindrical central rope having an external surface; (b) weaving a plurality of reflective threads together to form narrow width reflective strips; (c) braiding at least three of said narrow width reflective strips at a shallow cylindrical braid angle to form an omnidirectionally reflective sleeve having a braided construction; and (d) covering said external surface of said cylindrical central rope with said omnidirectionally reflective sleeve to form a pet leash with omnidirectional reflectivity having a central section, a proximal end and a distal end.

The process for manufacture of a reflective retractable pet leash further comprises a second set of steps for integrating the resultant omnidirectionally reflective pet leash into a retracting device so as to form the omnidirectionally reflective retractable pet leash, and includes the following steps: (1) attaching said proximal end of said pet leash to a reel member; (2) fixing said reel member within an internal chamber of a retractable housing device, said retractable housing device having a handle portion, a retraction control member actuated by a retraction control switch, a housing body with said internal chamber appointed with said reel member, and an extension-retraction aperture; (3) winding said reel member so that said proximal end becomes wrapped around said reel member and said central section of said pet leash is releaseably spirally arranged within said internal chamber of said retractable housing; (4) inserting said distal end of said pet leash within said extension-retraction aperture; and (5) attaching said distal end of said pet leash to a hardware component operable with a pet collar, said pet leash engaging with said reel member and said extension leash to operate in retracted and extended positions.

The omnidirectionally reflective pet leash is operable to sustain abrasion, substantial tensile forces, and to accommodate twist and flexure forces due to strength and movement afforded by the braided construction of the omnidirectionally reflective sleeve. The central section of the pet leash is releaseably spirally arranged within the internal chamber when the pet leash is in a retracted position, and the central section of the pet leash extends from the internal chamber and traverses the extension-retraction aperture when the pet leash is in an extended position.

The retractable leash comprises a cylindrical reflective braided sleeve having three or more narrow width reflective strips formed by way of weaving a plurality of reflective threads together. The narrow width reflective strips are braided at a shallow cylindrical braid angle. The cylindrical reflective braided sleeve is operable to surround the central cylindrical braided rope core thereby providing omnidirectional reflectivity.

BRIEF DESCRIPTION OF THE DRAWINGS

The invention will be more fully understood and further advantages will become apparent when reference is had to the following detailed description of the preferred embodiments of the invention and the accompanying drawings, in which.

DETAILED DESCRIPTION OF THE INVENTION

Figure 1A:
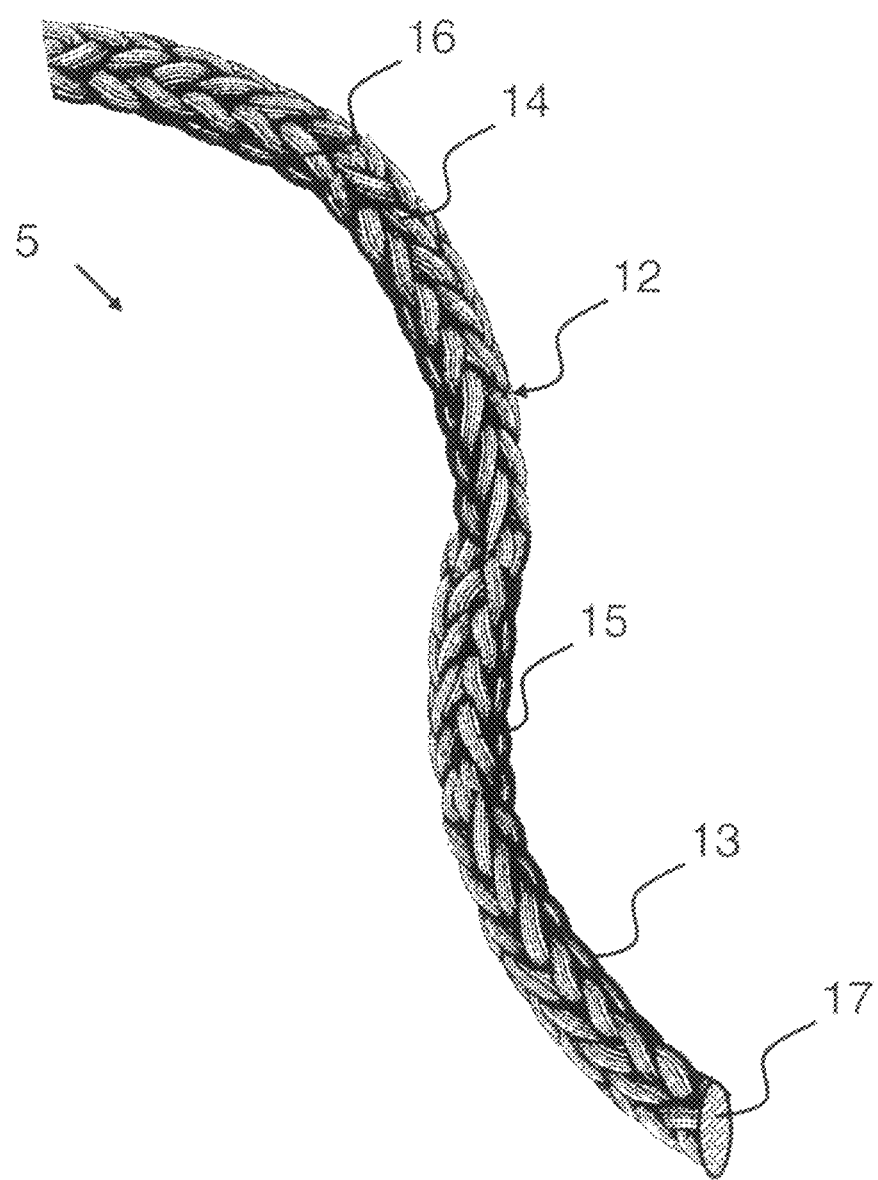
FIG. 1a is a schematic view showing a section of the omnidirectionally reflective retractable pet leash.

The present invention provides an abrasion resistant retractable pet leash that is flexible, twistable and omnidirectionally reflective. The retractable pet leash has a central section, a proximal end and a distal end. The proximal end of the retractable pet leash is fixedly connected to a reel that is located in an internal chamber of a retractable housing device. The retractable housing device is constructed with a handle portion, a retraction control member actuated by a retraction control switch, a housing body appointed with the internal chamber having the reel member therein mounted, and an extension-retraction aperture. The distal end is appointed to receive a hardware component operable with a pet collar. In this manner, the reflective leash extends completely to the hardware. In another embodiment, the distal end is attached to an extension leash which extends from the distal end and appends from the extension-retraction aperture of the retractable housing device. The extension leash is appointed to accommodate a hardware component operable with a pet collar. The proximal end of the pet leash is retained by the reel member so that the proximal end is wrapped around and engages with the reel member so that the central section of the retractable leash is releaseably spirally arranged within the internal chamber when the retractable leash is in a retracted position. Conversely, the central section of the retractable leash extends from the internal chamber and traverses the extension-retraction aperture when the retractable leash is in an extended position.

When the omnidirectionally reflective pet leash is extended from the retractable housing device, as when in use in the extended position, the pet leash omnidirectionally reflects incident light back to its source, thereby clearly defining the pet leash. Moreover, wherein the extension portion and the pet collar is further constructed with the subject omnidirectional properties, the pet leash and the neck portion of the pet that carries the choke collar are all clearly defined by the reflecting incident light. This increases the margin of safety in dusk or night time environments when a car headlight can illuminate the owner walking a pet and the pet, reducing the possibility of accidents. Since the omnidirectionally reflecting retractable pet leash reflects light over a broad range, due to its reflective cylindrical sleeve arrangement, the headlight can be at a significant angle and could still be reflected back.

The abrasion resistant omnidirectional pet leash is constructed by building a cylindrically reflective sleeve from narrow width strips composed of woven reflective threads and, optionally, non-reflective threads. Reflectivity is achieved by binding a plurality of retroreflectors using a transparent binder to a fabric or plurality of threads and forming retroreflector coated threads. Each thread is formed having a plurality of glass reflective elements or beads extending along the length thereof bonded thereto with a transparent bond layer. In an alternative construction, there is used an advanced reflective and coating technology wherein microscopic reflectors are embedded into the threads. These microscopic reflectors operate collectively to provide a reflective medium that acts like smooth mirrors, enabling reflection of light back to its source. With this construction, the threads remain supple, facilitating extension and retraction of the leash. At least three of these narrow width reflective strips formed from woven reflective threads are braided at a shallow cylindrical braid angle to form an omnidirectionally reflective sleeve having a braided construction. The narrow width reflective strips may be comprises of a combination of reflective thread and non-reflective threads.

The retroreflecting elements may be corner cubes, in which case the polymeric flexible sheet can be non-reflective. Alternatively, the retroreflecting elements may be microspheres. If microspheres are used as retroreflective elements, the polymeric flexible sheet needs to be reflective and is typically metallized with aluminum or silver. The flexible sheet with retroreflective elements is available from 3M Corporation. The trade name for this product is 3M™ Radiant Light Films—which provides films that can be slit to make 0.01" (0.25 mm) fibers. The product is available in a variety of sizes and colors. Other reflective threads are available from Jinjiang YeShiMing Reflective Material Co., Ltd, under the brand name YSM.

The reflective threads are highly flexible and can be worked into a weave to form the narrow width reflective strips, which are then braided at a shallow cylindrical braid angle to form an omnidirectionally reflective sleeve having a braided construction surrounding a central rope core of the leash, which substantially sustains the pet pulling tensile forces. The cylindrical braiding employs three or more narrow width strips. The cylindrical braiding is accomplished with a small angle between narrow width strips and the longitudinal direction of the central core rope. The proximal end of the central core of the leash is fashioned to form a loop representing a handle, and the distal end is formed to go through a metallic loop to create a choke leash. The cylindrical braiding is accomplished to cover the entire length of the pet leash, including the handle and the choke collar hardware. The ends of the braid are terminated by permanent bonding.

In an alternate embodiment, an extension leash extends from the distal end. Preferably, the extension leash is an omnidirectionally reflective extension leash constructed with the cylindrical reflective braided sleeve construction comprising three or more narrow width reflective strips comprised of woven reflective threads, braided at a shallow cylindrical braid angle and being operable to surround a central cylindrical braided extension rope core thereby providing omnidirectional reflectivity to the extension leash. Preferably, the cylindrical reflective braided extension sleeve of the omnidirectionally reflective extension leash is substantially coated with the conformal transparent polymeric abrasion resistant coating. Additionally, the omnidirectionally reflective extension leash may be constructed so that the extension leash has an end being looped and braided and attached to the hardware component to form a pet collar having omnidirectional reflectivity, and basically having choke functionality. In another embodiment, the hardware component of the extension leash comprises an adjustable metallic tab having a plurality of apertures connected to a pet leash clamp thereby forming a pet collar having non-choke functionality and omnidirectional reflectivity. In yet another embodiment, the extension leash's hardware component may comprise a clasp appointed to be releaseably connected to a pet collar; and preferably the pet collar is omnidirectionally reflective.

A transparent abrasion resistant coating is applied to the outer surface of the cylindrically reflective braided sleeve of the pet leash and is applied as a substantially conformal coating. The reflective strips have retroreflective threads throughout with corner cube prismatic or microsphere geometry embedded therein. These transparent retroreflective elements may be made from high refractive index transparent materials such as barium oxide-titanium oxide containing glasses. They exhibit a refractive index in the range of 1.9 to 2.2. The transparent abrasion resistant polymeric coating is selected to have a refractive index, which is significantly less than that of the retrorefractive elements. As a result, the incident and reflected light path is not significantly altered even when the incident beam is inclined to the reflective strips. The internal reflection process within the retroreflective elements is not deteriorated by the transparent abrasion resistant coating. The polymers suitable for use with the transparent abrasion resistant coating have a refractive index in the range of 1.3 to 1.55.

In addition to this refractive index requirement, the transparent abrasion resistant coating must exhibit excellent mechanical properties, including tensile strength and elongation, in order to provide the required abrasion resistance. The polymer coating must also exhibit superior bond properties to the retroreflective elements and the underlying polymeric sheet of the reflective strip. If the bond properties are poor, the transparent abrasion resistant coating may delaminate when the pet leash is subjected to abrasion or flexing and twisting movement. The transparent abrasion resistant coating must have low elastic modulus so that it remains flexible when the pet leash is twisted, retracted, extended, and spiraled within the retractable housing device. A high modulus transparent abrasion resistant coating is not desired since it applies significant stresses at the coating—reflective tape interface resulting in deterioration or fracture of the retroreflective elements.

A number of polymer systems meet these requirements. These polymers may be applied by dipping the cylindrically braided pet leash in a polymeric melt or by spraying a polymer composition dissolved in a suitable solvent. Thermosetting resin compositions such as two-component polyurethane may be painted or sprayed over the cylindrically braided reflective outer surface of the pet leash. In Table B below there are listed a number of transparent polymer compositions suitable for the pet leash abrasion resistant coating. Also listed are the refractive indexes for the compositions.

TABLE B

| Polymer Name | Refractive Index |
| --- | --- |
| aliphatic thermoplastic polyurethanes | 1.35 to 1.45 |
| Dow Corning OE-4100 Silicone elastomer | 1.4751 |

TABLE B-continued

| Polymer Name | Refractive Index |
|---|---|
| Polymethyl tetradecyl siloxane | 1.4550 |
| Poly vinyl acetate | 1.4665 |
| PMMA Poly methyl methacrylate | 1.4893 |
| Cellulose acetate | 1.4750 |
| Ethylene/vinyl acetate copolymer EVA | 1.4820 |

Thermoplastic aliphatic thermoplastic polyurethanes are preferred as compared to aromatic urethanes because of their transparency, resistance to dirt build-up, flexiblility ultraviolet radiation degradation resistance. Typically, aliphatic polyurethane has the structure

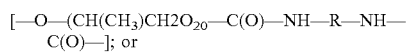
[—O—(CH(CH$_3$)CH2O$_{20}$—C(O)—NH—R—NH—C(O)—]; or

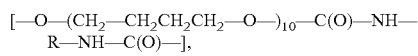
[—O—(CH$_2$—CH$_2$CH$_2$CH$_2$—O—)$_{10}$—C(O)—NH—R—NH—C(O)—], where R is a non-aromatic group.

Rohm and Haas, (Morton International Inc) supplies melt extrudable polyurethane compositions under the trade name designation MORTHANE L430.77 and MORTHANE Brand PN 3429-215. A melt extrusion process may be used to coat the external surface of the cylindrically braided reflective sleeve Aptec Laboratories, 28570, Livingston Avenue, Valencia Calif. 91355-4171. 661-257-1677 markets polyurethane with low elastic modulus for conformal coatings. Two component APTEK transparent unfilled polyurethane compositions of interest include the composition 2503-A/B (www.apteklabs.com/products/2503-AB.pdf) and the composition 2506-A/B (www.apteklabs.com/products/2506.pdf). These two compositions are designed for the encapsulation and protection of devices in applications that require toughness, excellent flexibility and optimum tensile strength, as well as elongation characteristics. APTEK 2503-A/B is curable at 80 C while APTEK 2506-A/B is room temperature curable. Both compositions are dissolved in a solvent and are therefore suitable for brush or spray application.

Bayer provides a number of clear polyurethane coating compositions based on one component or two component systems. Desmodular I aliphatic diisocyanate is often abbreviated to IPDI, CAS 4098-71-9. Polyurethane prepared from IPDI is clear, tough and resists photodegradation and hydrolysis. Isocyanurate based on IPDI is marketed by Bayer under the trade name Z-4470; and is available in a number of solvent blends. Two component polyurethane is commonly formulated with Desmodur Z-4470. Desmodur E polyisocyanates is a single component moisture curable system capable of being diluted in a solvent.

www.setcochemicals.net/resins4.htm discloses a flexible room temperature curing polyurethane coating designated ROTOTHANE® 9020. This coating adheres to plastics and leather.

Dow Corning supplies a number of silicone compositions suitable for coating the cylindrically braided reflective strips to provide abrasion resistance. Conformal coatings are materials applied in thin layers (typically a few mils or a fraction of a mm) onto printed circuits or other electronic substrates. They provide environmental and mechanical protection to significantly extend the life of the components and circuitry. Conformal coatings are traditionally applied by dipping, spraying or simple flow coating, and increasingly by select coating or robotic dispensing. Key requirements for the clear coating are low viscosity, enabling application of thin conformal coatings, room temperature cure in reasonable cure time and reasonable hardness. In Table C below there are shown some of the conformal silicone coatings marketed by Dow Corning.

TABLE C

| Product Name | One part/ Two part | Viscosity CPS | Cure | Durometer |
|---|---|---|---|---|
| 3-1965 | 1 | 110 | RT 24 Hrs Moisture cure | 29 A |
| 3-1953 | 1 | 360 | RT 24 Hrs Moisture Cure | 26 A |
| 3-1765 | 1 | 150 | RT 24 Hrs Moisture cure | 25 A |
| 3-1753 | 1 | 385 | RT 24 Hrs Moisture cure | 25 A |
| Sylgard 1-4128 | 2 | 450 | 20 min/85 C. | 64 OO |
| I-4105 | 1 | 470 | 10 min/105 C. | 65 OO |
| QI-4010 | 1 | 830 | 15 min/100 C. | 30 A |
| I-2620 | 1 | 250 | RT 72 Hrs | 25 D Abrasion Resistant |
| I-2577 LOW VOC | 1 | 1250 | RT 72 Hrs | 25 D Abrasion Resistant |
| I-2577 | 1 | 725 | RT 72 Hrs | 23 D Abrasion Resistant |

Candidates for silicone conformal coating compositions that meet the low viscosity in the range of 100-250 CPS, room temperature cure in reasonable time period and reasonable hardness are coating compositions 3-1965, 3-1765 and I-2620. These compositions may be dipped, brush painted or sprayed.

Of particular interest is a Dow Corning OE-4100 optical silicone elastomer, which cures in 2 hour at 150 C with a platinum based catalyst, as discussed in www.dowcorning.com/content/photonic/75-1009B-01.pdf. This composition is specifically developed for use in the optical coating of optical components and is clear, transparent with a refractive index of 1.47.

Polyvinyl acetate is soluble in acetone as well as toluene. Acetone dissolved polyvinyl acetate film has a slightly higher elastic modulus as compared to that dissolved in toluene due to rapid evaporation of acetone. Acetone dissolved polyvinyl acetate is applied to the cylindrically braided surface of the pet leash to form a flexible film which is resistant to twisting action of a pet leash. Polyvinyl acetate is available from Union Carbide under the trade names AYAC, AYAA, AYAF and AYAT depending upon the molecular weight of the polymer.

Figure 1B:
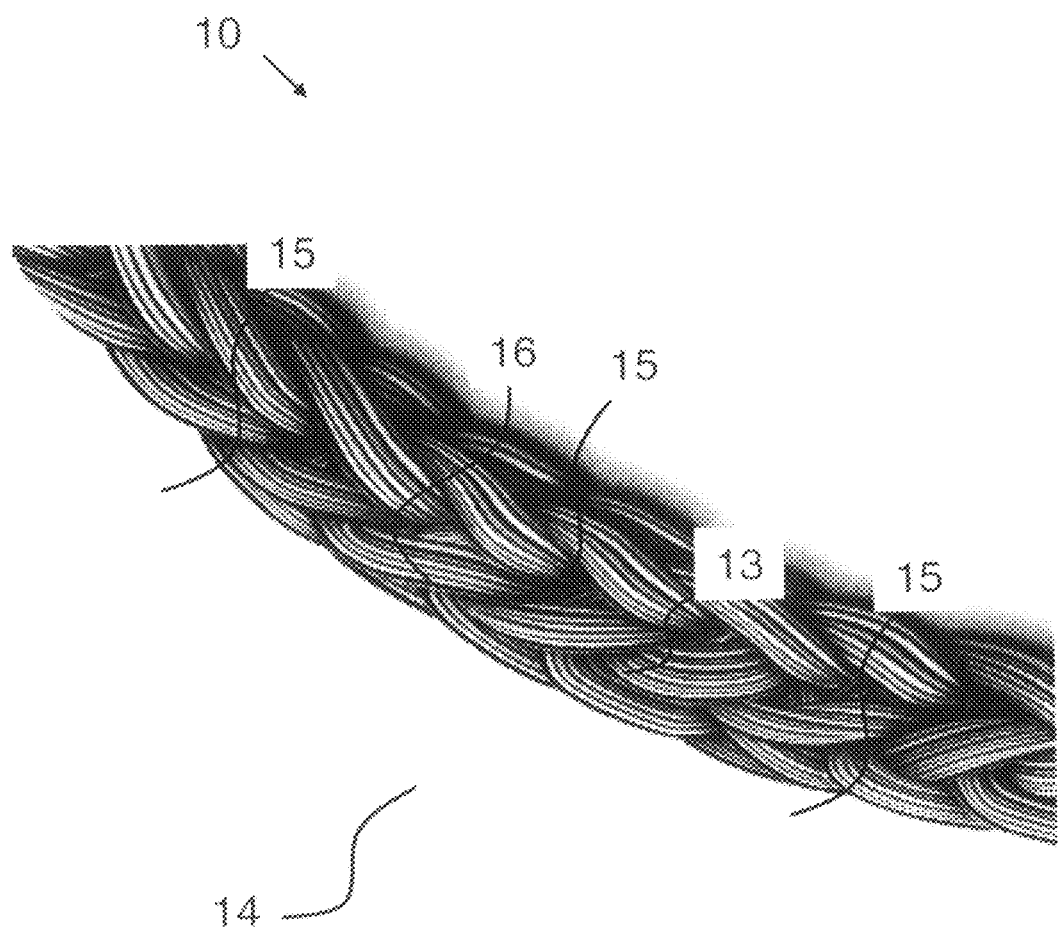
FIG. 1b is a colored photograph showing an exploded view of a portion of the central section of the omnidirectionally reflective retractable pet leash taken in the daytime.
Figure 1C:
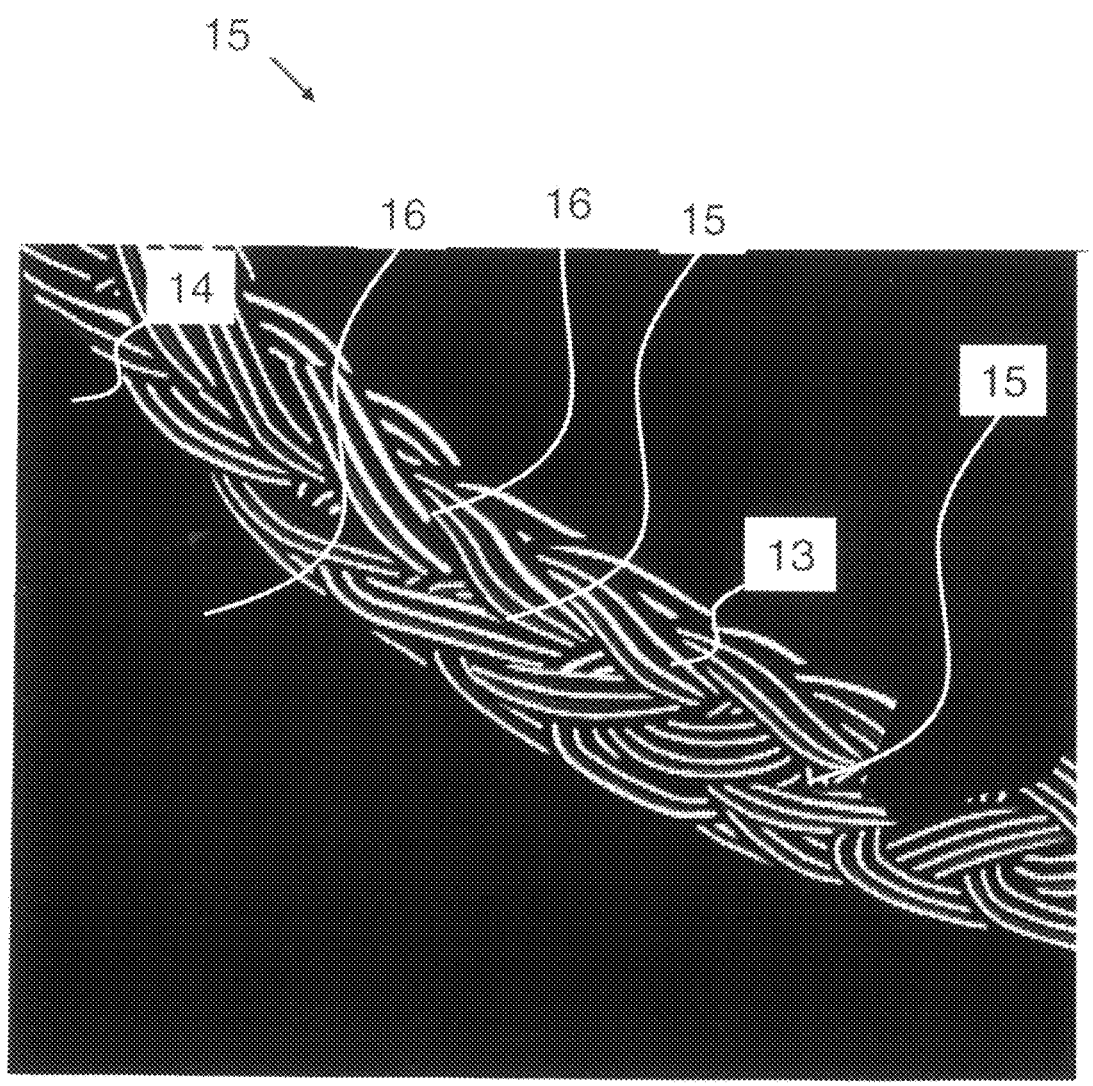
FIG. 1c is a colored photograph showing an exploded view of a portion of the central section of the omnidirectionally reflective retractable pet leash taken at night with camera flash light showing reflective portions as bright regions.

FIG. 1a is a schematic view showing a section of the omnidirectionally reflective retractable pet leash, shown generally at 5. FIG. 1b is a colored photograph showing an exploded view of a portion of the central section of the omnidirectionally reflective retractable pet leash taken in the daytime, shown generally at 10. FIG. 1c is a colored photograph showing an exploded view of a portion of the central section of the omnidirectionally reflective retractable pet leash taken at night with camera flash light showing reflective portions as bright regions, shown generally at 15.

The central section of the omnidirectionally reflective retractable pet leash 12 comprises a cylindrically braided sleeve 13 created from braided narrow width reflective strips 15 each composed of a plurality of reflective threads 16 woven together. The cylindrically braided sleeve 13 covers a central core 17 to provide omnidirectional reflectivity. This cylindrically braided sleeve 13, created from braided narrow width reflective strips 15, provides substantially the entire surface of the retractable leash with omnidirectional reflectivity. A plurality of reflective threads 16 is woven together, along with colored threads 14 (best seen in FIG. 1b), to form each of the narrow width strips 15.

The retractable leash completely reflects incident light in the same direction the light was emanated. Due to the cylindrical character of the reflective braided sleeve, some portion of the sleeve is always at normal orientation to the incoming light beam, that is, the direction at which the reflection from the retroreflective elements is maximized. Retroreflective elements bonded on the reflective threads 16 reflect light over a large range of acceptance angles, but the reflection is at a lower intensity. This cylindrical construction effectively reflects the incoming camera flash light as shown in the photograph of FIG. 1c by the extremely bright appearance of the retroreflector threads 16 of the leash. The light here, again, is reflected back to the illuminating source, and practically no light is directed in the direction of the camera.

Figure 2:
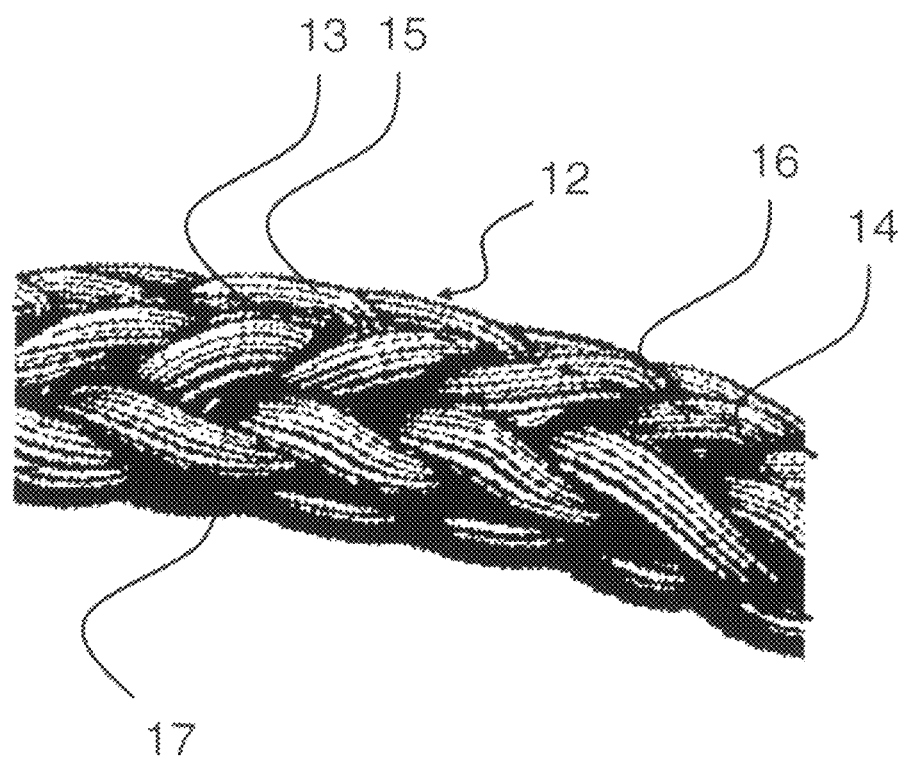
FIG. 2 is a photograph of a portion of the central section of the omnidirectionally reflective retractable pet leash illustrating the details of a transparent abrasion resistant polymeric conformal coating substantially covering the reflective cylindrical braided sleeve of narrow width strips comprised of woven reflective threads and other non-reflective threads surrounding a central pet leash core.

FIG. 2 is a photograph of magnified portion of the central pet leash 12. The cylindrical reflective braided sleeve 13 is formed by braiding narrow width reflective strips 15, which are formed of a plurality of reflective threads 16 and colored threads 14 worked into a weave. The narrow width reflective strips 15 are braided with a small braid angle of 5 to 10 degrees between the narrow width strips 15 surrounding the central cylindrical rope core 17 of the leash. The central cylindrical rope core 17 is completely covered by the cylindrical reflective braided sleeve 13 and therefore is invisible in the photograph. Preferably, a transparent abrasion resistant polymeric conformal coating substantially covers the reflective cylindrical braided sleeve 13 of narrow width strips 15. A plurality of reflective threads 16 is combined with colored threads 14 and worked into a weave to form the narrow width reflective strips 15. The narrow width reflective strips 15 are braided at a shallow cylindrical braid angle to form the omnidirectionally reflective sleeve 13 having a braided construction that surrounds the central rope core 17 and covers each of the proximal, central, and distal end sections of the leash, providing substantially the entire surface of the leash 12 with omnidirectional reflectivity.

Figure 3:
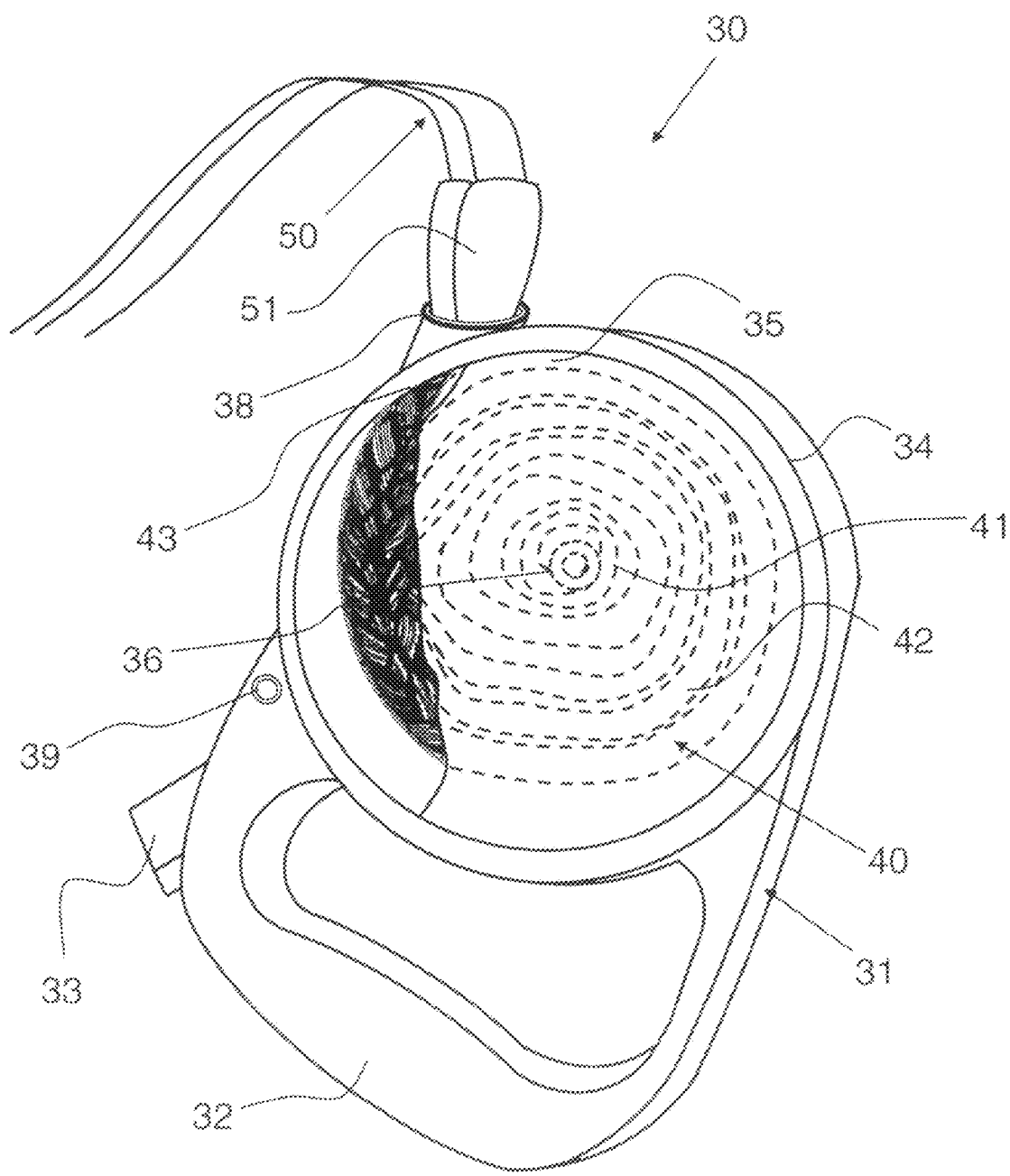
FIG. 3 is a cross sectional cut-away view of an embodiment of the omnidirectionally reflective retractable pet leash retracted within the retractable housing device, showing a cut-away view of the omnidirectionally reflective retractable pet leash wound around a reel and being retained and housed within the internal chamber of the retractable housing, as when the leash is in a non-extended or [fully] retracted position.

FIG. 3 shows a cut-away cross sectional view of an embodiment of the omnidirectionally reflective retractable pet leash, shown generally at 30. A retractable housing device 31 is provided having a handle portion 32, a retraction control member actuated by a retraction control switch 33, a housing body 34 with an internal chamber 35, and an extension-retraction aperture 38. Generally, the construction of the retractable housing is similar to those heretofore known in the art. Internal chamber 35 is further appointed with a reel member 36. Omnidirectionally reflective retractable pet leash 40 is herein housed or retracted within internal chamber 35 of housing body 34 of retractable housing device 31. Omnidirectionally reflective retractable pet leash 40 includes a proximal end section 41, a central section 42, and a distal end section 43. Retractable housing device 31 may be composed of varying materials; preferably of a polymeric material. Reflective portions or a reflective surface may be applied to retractable housing device 31 so that same has reflective properties.

An extension leash 50 appends from the extension-retraction aperture 38 of retractable housing device 31. Extension leash 50 is appointed to accommodate a hardware component (not shown in this figure, but see FIG. 4a) operable with a pet collar. Herein extension leash 50 is shown as a flat leash portion. Preferably, extension leash 50 includes reflective properties. Extension leash 50 is fixedly attached to distal end section 43 of omnidirectionally reflective retractable pet leash 40. A stopper 51 is provided where extension leash 50 and distal end section 43 mate. Stopper 51 prevents extension leash 50 from entering internal chamber 35 of retractable housing device 31. Extension leash 50 appends from distal end section 43, extension-retraction aperture 38, and stopper 51.

Proximal end section 41 of retractable pet leash 40 is fixedly connected to reel member 36 located in internal chamber 35 of retractable housing device 31. Retention by reel member 36 of proximal end section 41 of pet leash 40 causes proximal end section 41 to become wrapped around and engage with the reel member 36 so that central section 42 of retractable leash 40 is releaseably spirally arranged within internal chamber 35 when the retractable leash is in a retracted position. As the retraction control member actuated by retraction control switch 33 is manually released and pulling force is applied to the extension leash 50, omnidirectional leash 40 is uncoiled and gradually released from internal chamber 35, until retraction control switch 33 is manually engaged to a locking position, thus locking reel member 36 and visa vie omnidirectionally reflective leash 40. A lock 39 is also provided on retractable housing device 31 to place the reel member 36 and visa vie omnidirectionally reflective retractable leash 40 in a locked position preventing further feed or extension and/or retraction of pet leash 40. Portions of central section 42 of retractable leash 40 are released from internal chamber 35 and traverse extension-retraction aperture 38 when retractable leash 40 is in the extended position. Coiling or spiraling of the omnidirectionally reflective leash 40 allows for retract-ability; sizing of the leash 40 may vary.

Figure 4A:
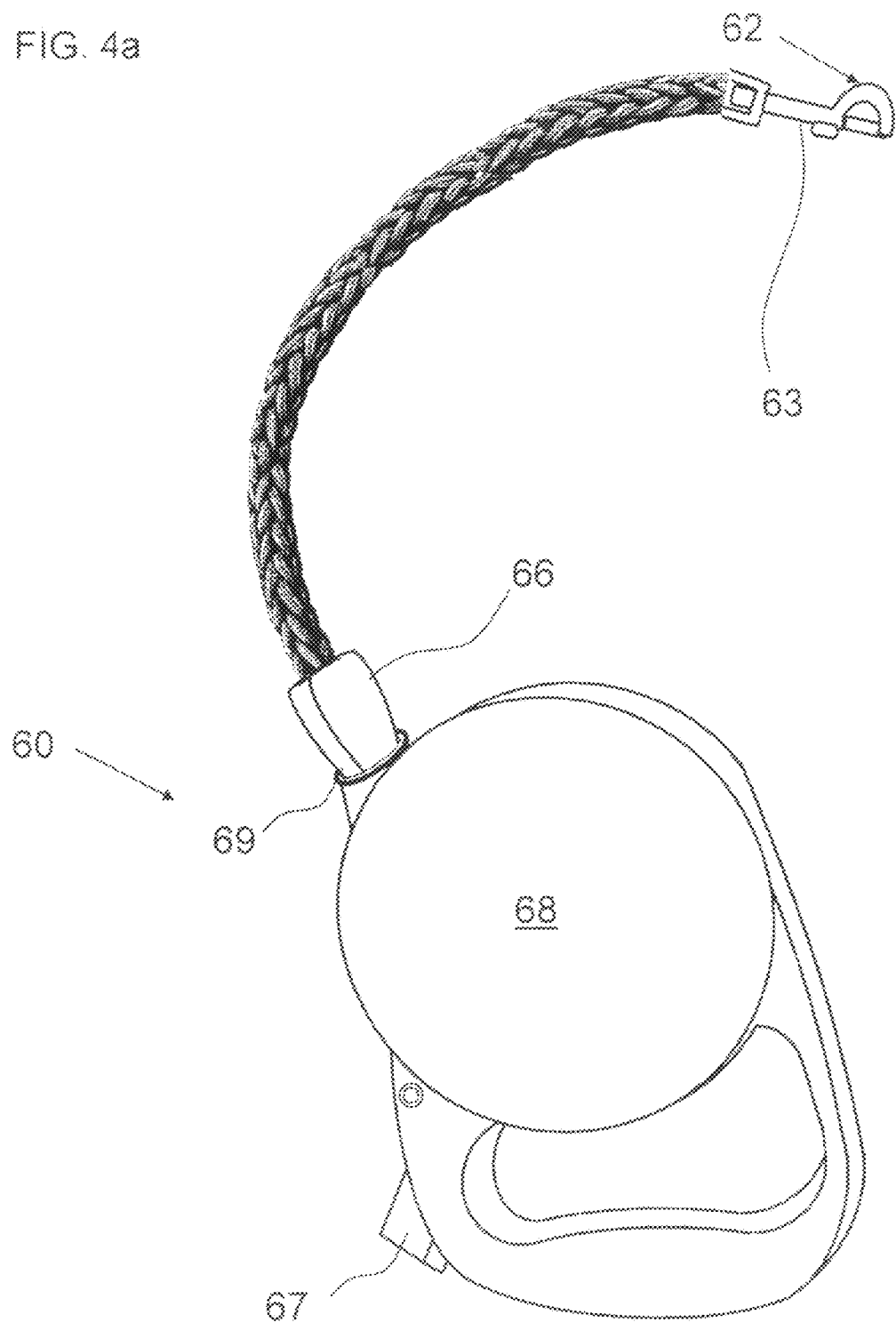
FIG. 4a is a top plane view of another embodiment of the omnidirectionally reflective retractable pet leash, showing the optional extension leash as an omnidirectionally reflective extension leash having omidirectional reflectivity, and wherein the omnidirectionally reflective retractable pet leash is in the fully retracted position.
Figure 4B:
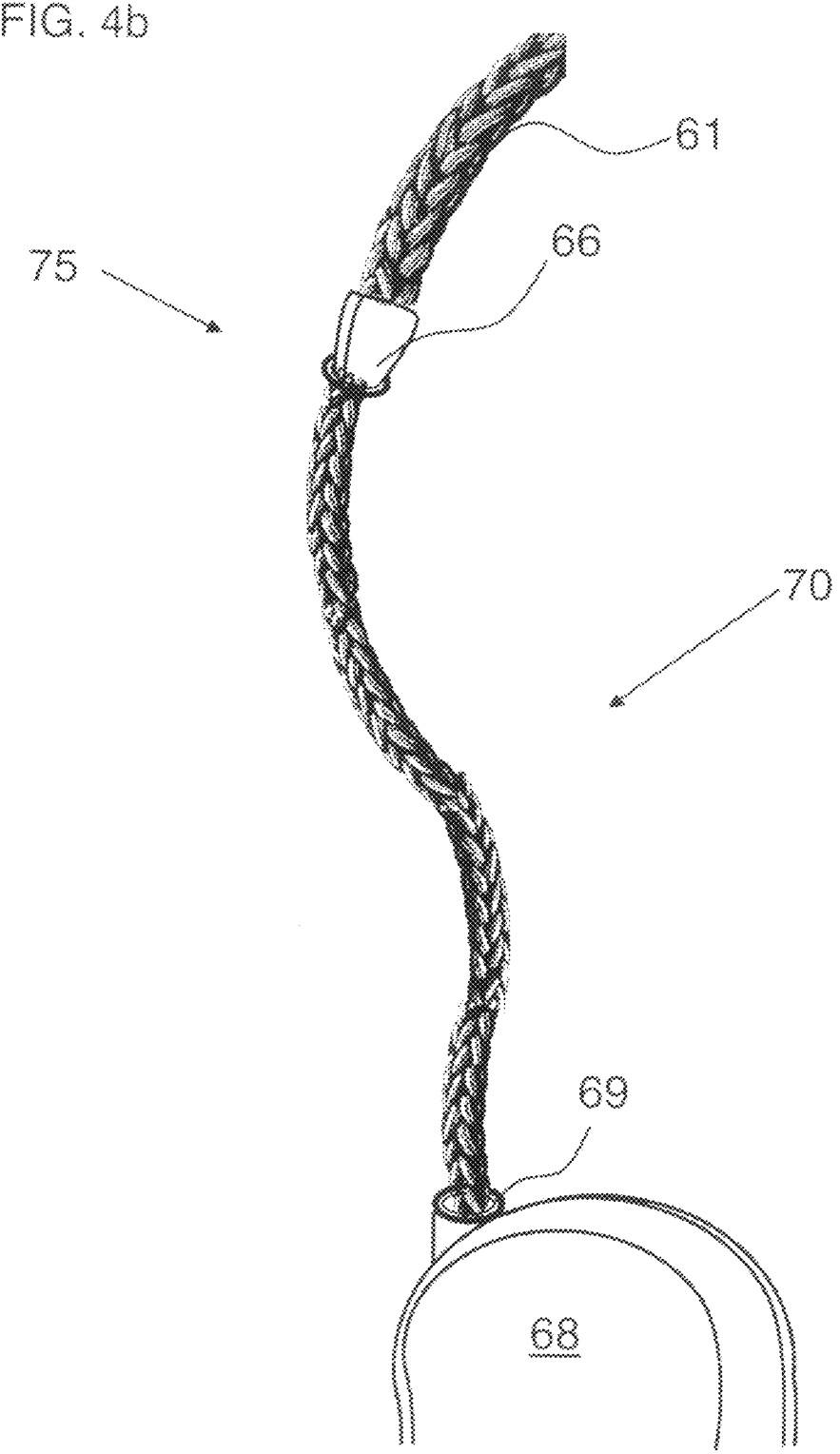
FIG. 4b is a cross sectional view showing a portion of the omnidirectionally reflective retractable pet leash extended from the retractable housing device, as when the leash is being extended.

FIGS. 4a and 4b illustrate a preferred embodiment wherein the extension leash is constructed as an omnidirectionally reflective extension leash having omnidirectional reflectivity. In FIG. 4a the omnidirectionally reflective retractable pet leash is in the fully retracted position, housed within the retractable housing device, shown at 60. FIG. 4c shows the omnidirectionally reflective retractable pet leash with a portion thereof extended from the retractable housing device, shown generally at 75. Omnidirectionally reflective extension leash 61 is fixedly attached to omnidirectionally reflective retractable leash 70 via the distal end thereof, at stopper 66, and appends from retractable housing device 68. Omnidirectionally reflective retractable leash 70 is housed when in the fully retracted position. As pulling force is applied to omnidirectionally reflective extension leash 61, and the retraction control switch 67 is manually placed in the unlock position, omnidirectionally reflective pet leash 70 begins to unwind and traverses extension-retraction aperture 69 as it exits retraction housing device 68. The omnidirectionally reflective retractable pet leash 70 may vary in size from the omnidirectionally reflective extension leash 61 (mm/cm). The omnidirectionally reflective extension leash 61 may have a greater diameter size than omnidirectionally reflective retractable pet leash 70 and the extension-retraction aperture 69. Omnidirectionally reflective pet leash 70 is smaller in diameter that extension-retraction aperture 69 so that the leash 70 can readily pass through extension-retraction aperture 69.

Extension leash is an omnidirectionally reflective extension leash 61 constructed with a cylindrical reflective braided extension sleeve comprising three or more narrow width reflective strips braided at a shallow cylindrical braid angle operable to surround a central cylindrical braided extension rope core thereby providing omnidirectional reflectivity to the extension leash 61. Preferably, the cylindrical reflective braided extension sleeve of the omnidirectionally reflective extension leash 61 is substantially coated with a conformal transparent polymeric abrasion resistant coating to mitigate damage of the reflective properties.

Hardware component 62, herein shown as a clasp 63 appointed to be releaseably connected to a pet collar, is attached to omnidirectionally reflective extension leash 61. The hardware component may vary in structure. The reflective braid is braided around hardware component 62. In another embodiment, hardware component 62 comprises an adjustable metallic tab having a plurality of apertures connected to a pet leash clamp thereby forming a pet collar having non-choke functionality and omnidirectional reflectivity. Alternatively, omnidirectionally reflective extension leash 61 has an end being looped and braided and attached to a hardware component to form a pet collar having omnidirectional reflectivity as is shown in FIG. 5, shown at 100.

Figure 5:
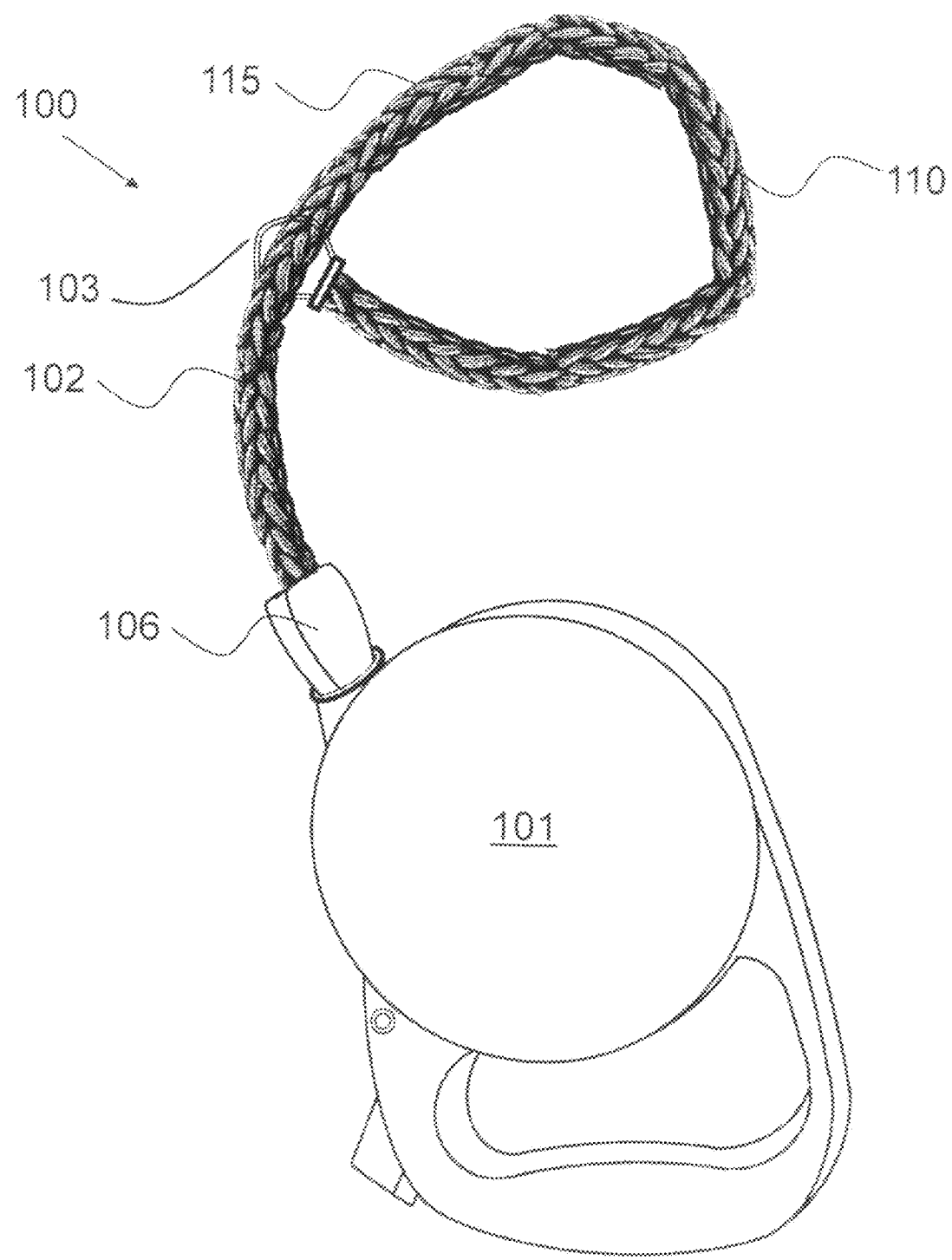
FIG. 5 is a top plane view of cross sectional view of another embodiment of the omnidirectionally reflective retractable pet leash, showing the omnidirectionally reflective extension leash having an end being looped and braided and attached to a hardware component to form a pet collar having omnidirectional reflectivity.

In FIG. 5, omnidirectionally reflective retractable pet leash (not shown because is in the fully retracted position— what is shown however, is extension leash appending from the distal end of the pet leash) is housed within retractable housing device 101. Omnidirectionally reflective extension leash 102 is fixedly attached to the retracted omnidirectionally reflective retractable leash (not shown) at stopper 106, and appends from retractable housing device 101. Extension leash is constructed herein as an omnidirectionally reflective extension leash 102 structured with a cylindrical reflective braided extension sleeve comprising three or more narrow width reflective strips 115 comprised of a plurality of reflective threads and colored threads. The narrow width reflective strips 115 are braided at a shallow cylindrical braid angle operable to surround a central cylindrical braided extension rope core thereby providing omnidirectional reflectivity to the extension leash 102. Omnidirectionally reflective extension leash 102 has an end being looped and braided and attached to a hardware component 103 to form a pet collar 110 having omnidirectional reflectivity. The collar 110 is generally of a choker type functioning collar.

The key features of the abrasion resistant omnidirectionally reflective retractable pet leash includes, in combination, the features set forth below:

1. a pet leash comprised of a central cylindrical braided rope core composed of braided nylon or polypropylene fibers capable of sustaining tensile forces developed by pet leash loads;
2. the central cylindrical braided rope core being covered substantially with a transparent abrasion resistant conformal coating applied to a cylindrically reflective braided sleeve;
3. the cylindrically reflective braided sleeve formed by cylindrically braiding narrow width reflected strips, formed from knitted, woven or braided reflective threads and colored threads;
4. each of the reflective threads preferably comprising retroreflectors such as corner cube geometry retroreflectors or microspheres;
5. twist and flexure forces acting on the abrasion resistant omnidirectionally reflective retractable pet leash being accommodated by the braided construction of the cylindrical reflective sleeve and the flexibility of abrasion resistant coating;
6. the cylindrical braided sleeve-covered retractable pet leash substantially reflecting incident light back in the same direction as the incident light, clearly indicating the whereabouts of the pet leash handle, pet leash central portion, and the pet leash collar surrounding the neck; and
7. the abrasion resistant omnidirectionally reflective retractable pet leash providing an increased margin of safety for pets and their owners while walking in dimly lit environments, such as parking garages, or inclement weather conditions, where rapidly moving vehicles are encountered.

The abrasion resistant omnidirectionally reflective retractable pet leash disclosed herein can be modified in numerous ways without departing from the scope of the invention. For example, the pet collar can be integral with the central rope core of the extension leash or detachable therefrom via fastening means in the conventional way. These and other modifications are intended to fall within the scope of the invention, as defined by the subjoined claims.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A reflective retractable pet leash, consisting of:
   a. a central cylindrical braided rope core having braided nylon or polypropylene fibers, said central cylindrical braided rope core being operable to sustain substantial tensile forces;
   b. a cylindrical reflective braided sleeve comprising three or more narrow width reflective strips that are braided at a shallow cylindrical braid angle, said cylindrical reflective braided sleeve being operable to surround said central cylindrical braided rope core thereby providing omnidirectional reflectivity;
   c. said narrow width reflective strips comprising a plurality of reflective threads woven together, each of said reflective threads being formed having a plurality of glass reflective elements;
   d. a retractable housing device having a handle portion, a retraction control member actuated by a refraction control switch, a housing body with an internal chamber appointed with a reel member, and an extension-retraction aperture;
   e. said retractable leash having a central section, a proximal end section and a distal end section, said proximal end being retained by said reel member so that said proximal end is wrapped around and engages with said reel member, said distal end being appointed to accommodate a hardware component operable with a pet collar, wherein said central section of said retractable leash is releaseably spirally arranged within said internal chamber when said retractable leash is in a retracted position and wherein said central section of said retractable leash extends from said internal chamber and traverses said extension-retraction aperture when said retractable leash is in an extended position;
   f. said reflective threads further comprising a plurality of microsphere retroreflectors bonded thereto with a transparent bond layer, said reflective threads further comprising a plurality of corner cube retroreflectors, and said retroreflectors having a refractive index in the range of 1.9 to 2.2;

g. said hardware component comprising a clasp appointed to be releaseably connected to a pet collar;
h. said reflective threads are substantially coated with a conformal transparent polymeric abrasion resistant coating;
i. said cylindrical reflective braided sleeve is substantially coated with a conformal transparent polymeric abrasion resistant coating;
j. said narrow width reflective strips further comprise a plurality of non-reflective threads;
k. said transparent polymeric abrasion resistant coating having a thickness in the range of 0.002 to 0.010 inches and a refractive index in the range of 1.3 to 1.55, and said transparent polymeric abrasion resistant coating being a member selected from the group consisting of polyurethane, silicone, polymethyl methacralate, and polyvinyl acetate;
l. said retractable housing device comprising reflective portions; and
m. each of said narrow width reflective strips have a width of 0.0065 to 0.25 inches.

2. A reflective retractable pet leash as recited by claim 1, wherein said distal end of said retractable leash comprises an extension leash, said extension lease being appointed to append from said extension-retraction aperture of said retractable housing device and being appointed to accommodate said hardware component operable with said pet collar.

3. A reflective retractable pet leash as recited by claim 2, wherein said extension leash has reflective properties.

4. A reflective retractable pet leash as recited by claim 2, wherein said hardware component comprises an adjustable metallic tab having a plurality of apertures connected to a pet leash clamp thereby forming a pet collar having non-choke functionality and omnidirectional reflectivity.

5. A reflective retractable pet leash as recited by claim 1, wherein said cylindrical reflective braided sleeve is braided at a braid angle of 5 to 10 degrees.

6. A reflective retractable pet leash as recited by claim 1, wherein said distal end of said leash is looped and attached to said hardware component to form a pet collar having omnidirectional reflectivity.

\* \* \* \* \*